June 5, 1951     J. C. LYON     2,556,140
SLEEPING CAR

Filed June 14, 1945     7 Sheets-Sheet 1

INVENTOR
John C. Lyon.
BY John P. Darby
ATTORNEY

INVENTOR
John C. Lyon.
BY John P. Tasbox
ATTORNEY

June 5, 1951  J. C. LYON  2,556,140
SLEEPING CAR

Filed June 14, 1945  7 Sheets-Sheet 3

INVENTOR
John C. Lyon.
BY John P. Parks
ATTORNEY

June 5, 1951   J. C. LYON   2,556,140
SLEEPING CAR
Filed June 14, 1945   7 Sheets-Sheet 4

INVENTOR
John C. Lyon
BY John P. Dixon
ATTORNEY

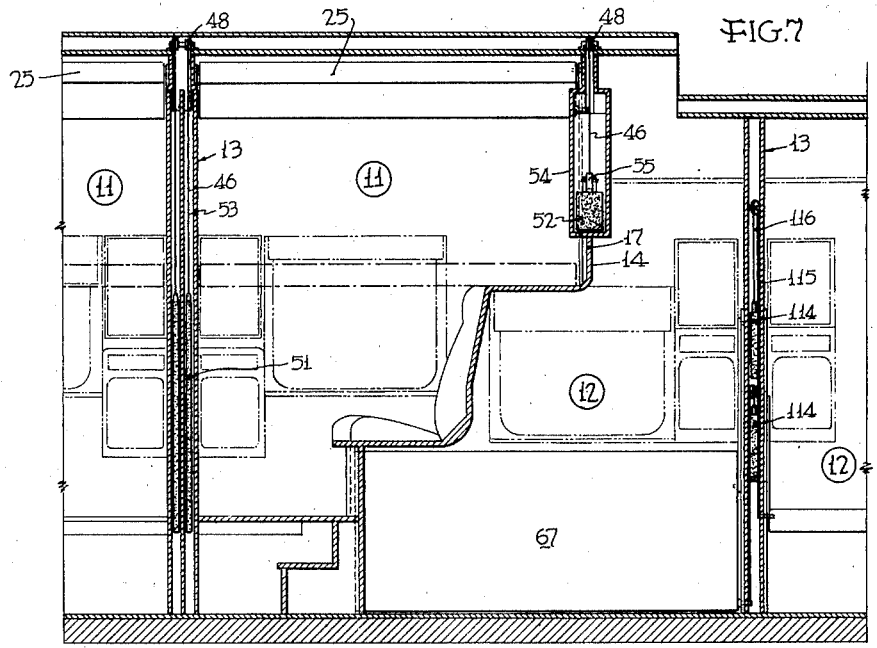
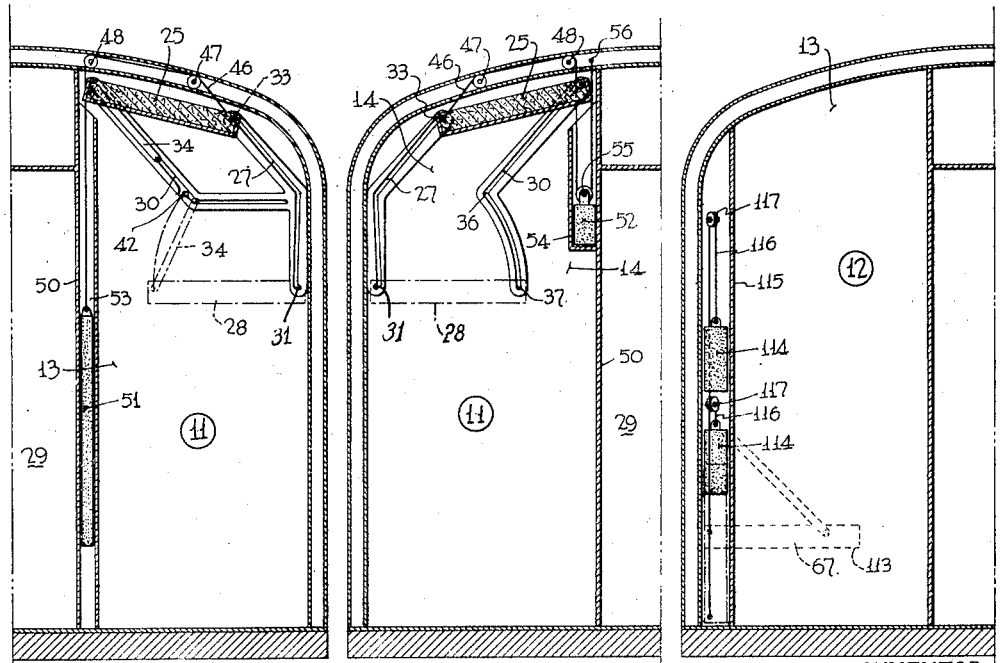

June 5, 1951   J. C. LYON   2,556,140
SLEEPING CAR
Filed June 14, 1945   7 Sheets-Sheet 6
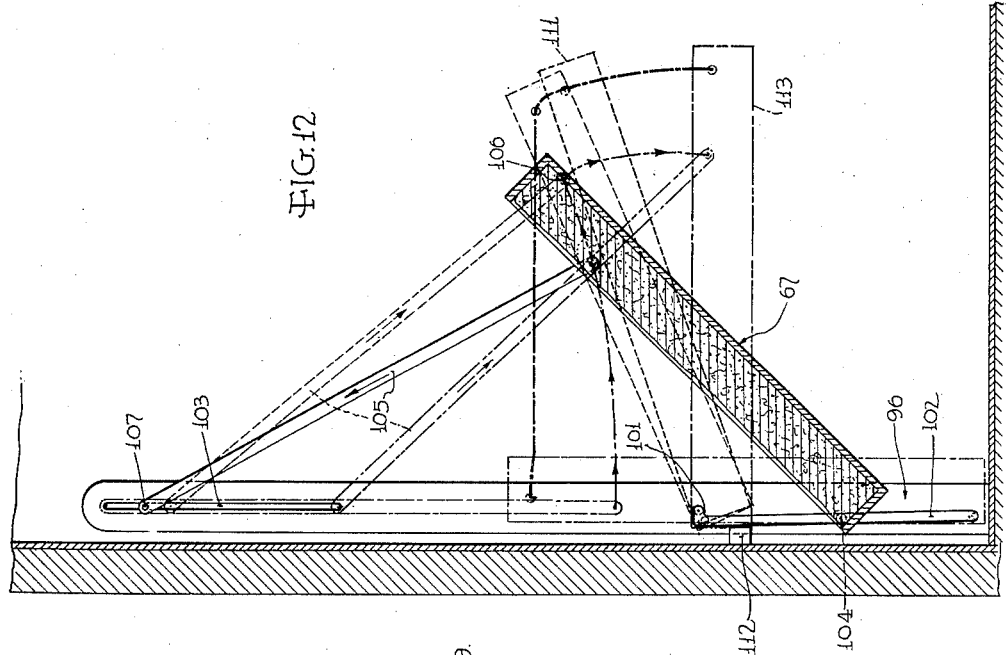
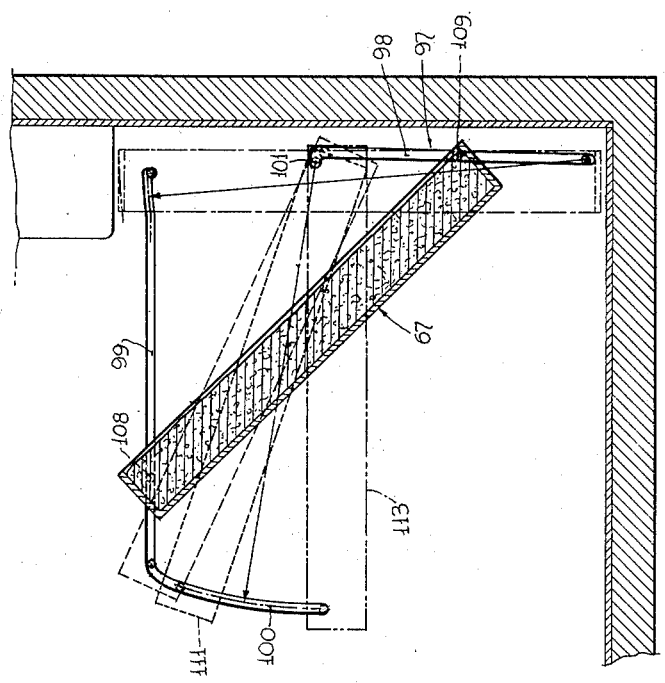
INVENTOR
John C. Lyon
BY John P. Tatro
ATTORNEY

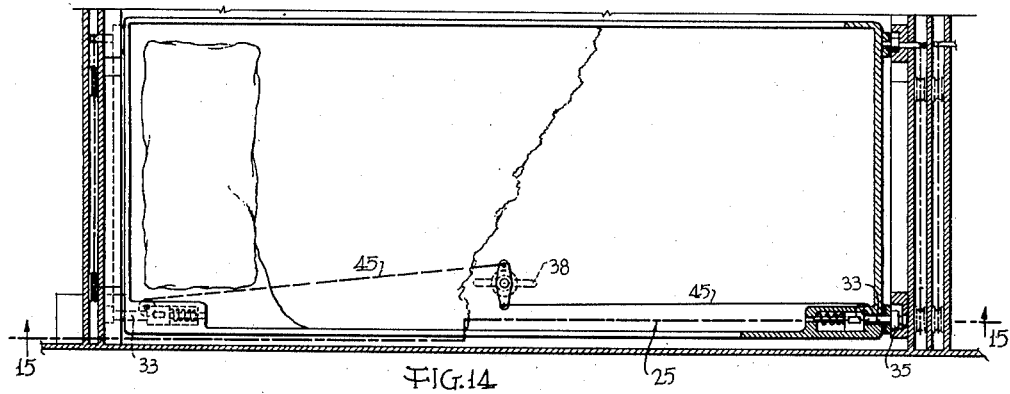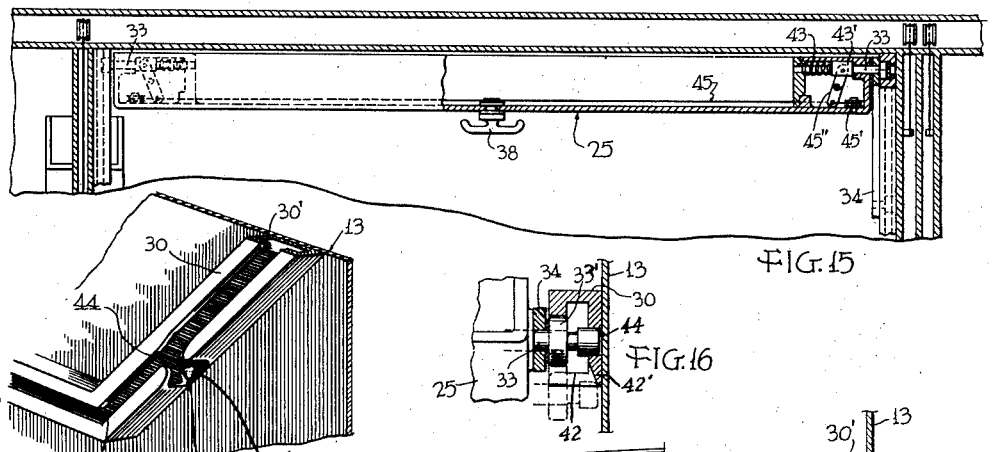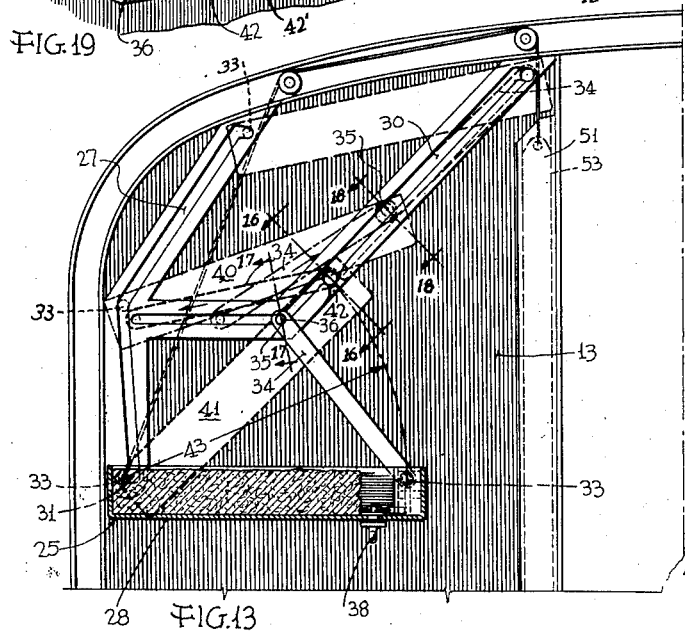

Patented June 5, 1951

2,556,140

UNITED STATES PATENT OFFICE 2,556,140

SLEEPING CAR

John C. Lyon, Upper Darby, Pa., assignor to The Budd Company, Philadelphia, Pa., a corporation of Pennsylvania Application June 14, 1945, Serial No. 599,349

10 Claims. (Cl. 105—315)

1

The sleeping car of my invention has been devised by me as an improvement upon the sleeping car of one Goodrich K. Murphy, as shown in Patent 2,464,749 issued March 15, 1949. Like the Murphy car, my car consists of two longitudinal series of longitudinally arranged single-occupancy rooms, one such series placed on each side of the central aisle of the car. Like the Murphy rooms, the longitudinal seat level dimensions of each room available to the occupant when seated is substantially equal to the combined longitudinal dimensions of the plan form projection of upright seat back, horizontal seat cushion and horizontally extended fore leg length of the occupant. Room constructions and furniture arrangements which admit these dimensions permit, with maximum passenger comfort, a maximum number of rooms in a car of given length. Two series of rooms in a car of standard length constructed according to the Murphy invention will afford single occupancy for thirty-two passengers, each in his own room.

The aim of my invention has to do outstandingly with the construction and arrangement of the beds and related furniture, and with the manipulation of the beds to and from their positions of use. My aim has been to evolve constructions, arrangements and manipulating means of simpler and more efficient order than those heretofore used, thus to render the beds the more readily manipulable.

A further object is the general lowering of the levels of the beds in each room in their positions of use, whereby convenience of access is materially improved.

Various and sundry other objects and advantages will appear upon the full understanding which is to be had from the following description and the accompanying drawings. Of the latter:

2

Figure 2:
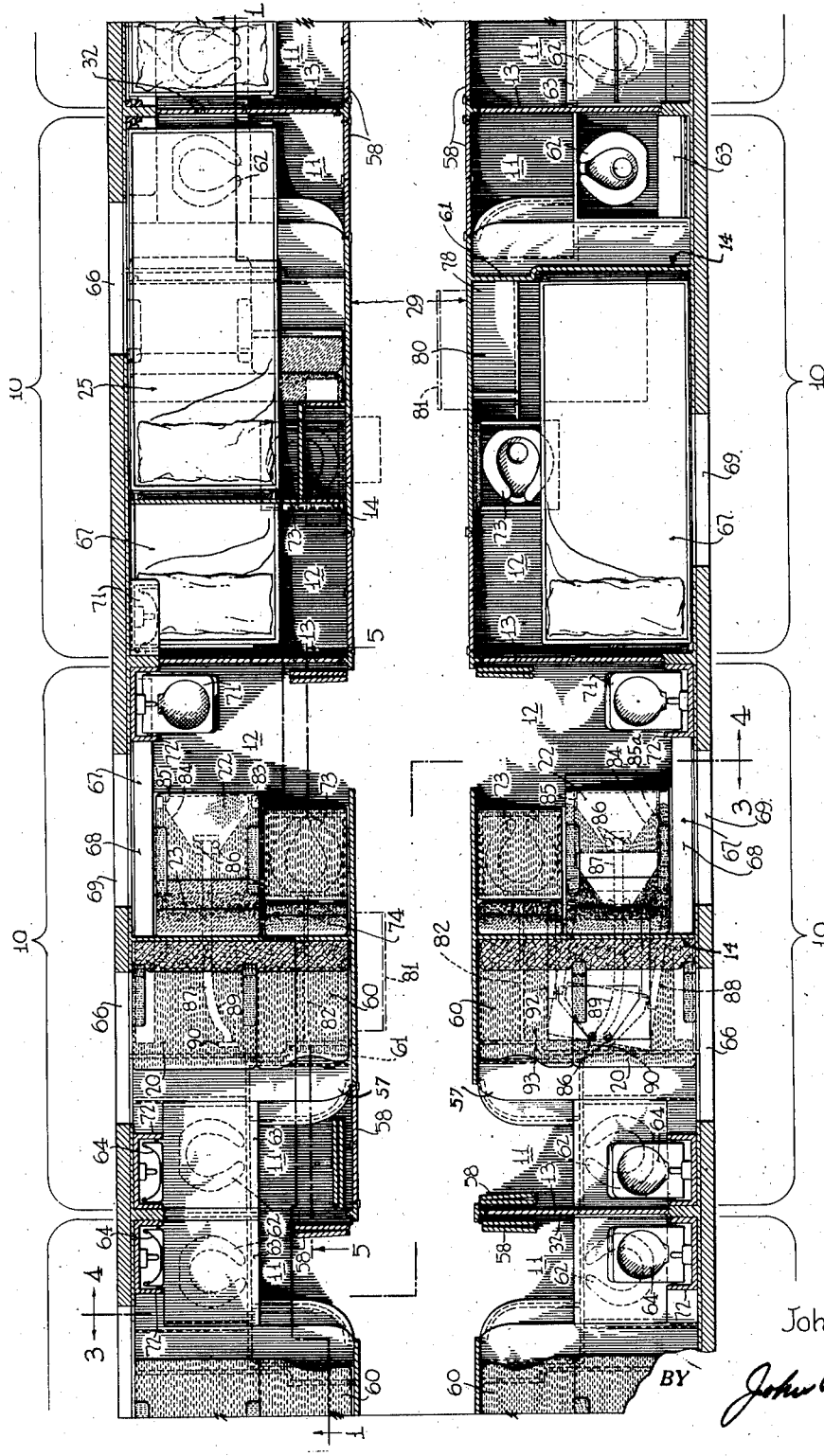
Figure 2 is a combination of two horizontal sections in one and the same horizontal sectional view, the section shown above the central aisle of the car being on line 2a—2a of Figure 1, and the section shown below the central aisle of Figure 2 being taken on line 2b—2b of Figure 1, in each case looking in the direction of the arrows.
Figure 5:
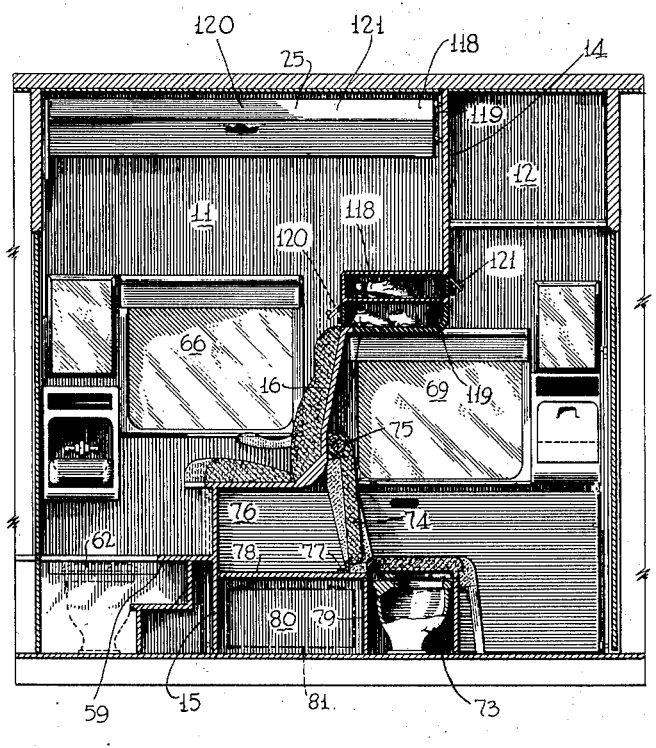
Figure 6:
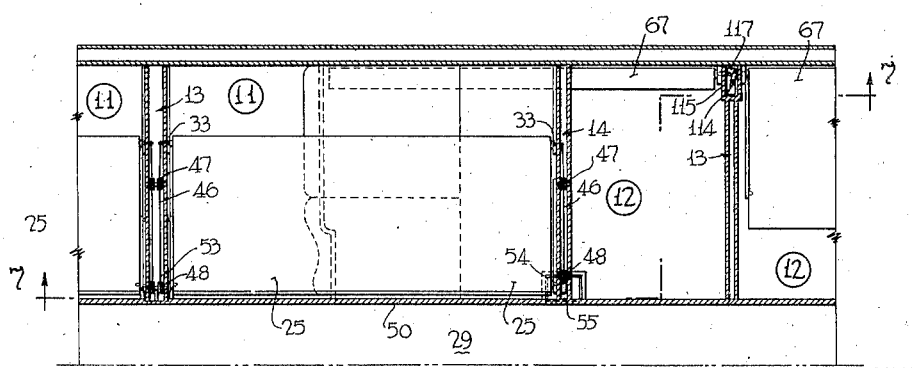

Figure 5 is a vertical section on line 5—5 of Figure 2 looking in the direction of the arrows;

Figure 6 is a sectional plan view showing diagrammatically the arrangement of the counterweight system associated with beds of the adjacent rooms;

Figure 7 is a vertical section, more or less diagrammatic, in a plane generally indicated by lines 7—7 in Figure 6;

Figure 8 is a sectional elevation of an end wall of a room showing diagrammatically the upper bed supporting trackways and counterweights;

Figure 9 is a similar showing of the opposite end wall of the room;

Figure 10 is a showing similar to that of Figure 9 but showing the lower bed supporting trackways and counterweight system;

Figures 11 and 12 are enlarged detail views showing diagrammatically the trackways and support system at the opposite ends of the bed in the lower seat level room;

Figure 13 is an enlarged detail view similar to Figure 8 but on the opposite side of the car showing the bed guiding and supporting system for one end of the upper level bed in greater detail;

Figures 14 and 15 are enlarged fragmentary detail views, showing more or less diagrammatically the upper level bed guiding and supporting and locking system, Figure 14 being a sectional plan view and Figure 15 a sectional elevational view;

Figures 16, 17 and 18 are fragmentary detail sectional views on an enlarged scale taken as indicated by the section lines 16—16, 17—17 and 18—18, respectively on Figure 13; and Figure 19 is a fragmentary detail perspective view on an enlarged scale of a part of the bed guideway shown in Figure 13.

The unit of each series of pairs of rooms is the pair 10 comprised of rooms 11 and 12 as defined by the transversely extending end walls 13 of the pair and an intermediate transverse partition 14. The end walls 13 of the pair 10 are substantially of geometrically plane form. The intermediate partition wall 14, however, is of zig-zag form, comprised of three vertically extending portions, a lower 15, an intermediate 16 and an upper 17, and two substantially horizontally extending portions which connect these vertically extending portions, one of lower level designated 18 connecting vertical portions 15 and 16, and the other of higher level designated 19 connecting vertical portions 16 and 17. The intermediate vertically extending portion 16 is arranged substantially mid-way between the plane end walls 13, while the lower and upper vertically extending portions 15 and 16 lie respectively displaced oppositely therefrom. The connecting horizontally extending portions 18 and 19 constitute, with the portions 15 and 17, respectively, opposite offsets from the mid-portion 16, the one extending into the room 11, and the other extending into the room 12. Between the upper vertical portion 17 and the end wall 13 of room 12 is provided a standing room space extending full height above the standing room floor area therebelow. Similar full-height standing space is provided in room 11 between vertical portion 15 and the room end wall 13.

The seat 20 in room 11 is arranged with its horizontal seat cushion directly supported upon the top of the offset 18 and its seat back 21 against the vertical mid-portion 16. Seat 22 of room 12 also has its back 23 against the mid-portion 16. However, this seat 22 is supported from room floor level 24, which is the same as the car floor level, and its horizontal seat cushion in vertical projection substantially underlies the upper horizontal offset 19 of partition 44. Adequate height is, however, provided between the offset and seat to permit a seat occupant to rise from the seat without striking his head against the offset.

The bed 25 of room 11 of the pair 10 is normally fully extended longitudinally and stored in its fully extended made-up condition in juxtaposition to the ceiling or roof 26 of the car. From this position, it may be moved by bodily translation vertically to its horizontal position of use, that shown in the pair of rooms at the right of Figure 1 and in plan at the upper right of Figure 2. In this position, its one end overlies and may rest upon the upper side of the horizontal offset 19 of partition wall 14. The manipulating means which I have devised for this bodily movement of translation of the beds 25 comprises a system of trackways which appear more clearly in Figures 3, 4, 6, 7, 8, 9 and 14 to 19 inclusive.

Adjacent the car side wall upon the vertical portion 17 of partition wall 14 and on the end wall 13 of room 11 also adjacent the car side wall, I provide an angular slotted trackway 27, one branch of the angle of which extends vertically from use bed level position 28 closely adjacent the side wall of the car, and the other branch of which extends inwardly to a position close to the roof 26. Inwardly toward the aisle 29 of the car a distance substantially bed-width from the trackway 27, I provide a trackway 30 also angular and of slotted form. On the partition wall 14, this trackway 30 has its upper branch approaching parallelism with the upper portions of trackway 27, but its lower branch instead of being straight and approaching parallelism with the lower branch of trackway 27 is arcuate in form, the arc being drawn about the lower end 31 of trackway 27 and terminating horizontally opposite the lower end 31. The ends of the trackways, both upper and lower, are closed as shown. Complemental such trackways are provided in corresponding positions on end wall 13. The trackways 30 on the end wall 13, however, while they have upper branches corresponding to the upper branches of those of partition wall 17, have no arcuate lower branches but instead lower branches which extend horizontally laterally outwardly toward trackway 27 where their slots terminate in closed ends, Figures 8 and 13. This arrangement, as will presently appear, permits of opening doors 32 in the end walls 13 to provide intercommunicating rooms.

The beds 25 are supported from trackways 27 and 30 by means of end ball roller pins 33 which project from the ends of the bed frames into the slots in the trackways and roll therein. Additionally, the end of the bed supported from end wall 13 (see Figures 4, 8, 13 and 18) is provided with a suspension link 34 hinged at one end about pin 33 and having its opposite end provided with a slidable anchor 35 which is guidingly retained in a widened inner portion 30' of the slot of trackway 30 (see detail Figure 16 to 19 inclusive). This link 34 is of such length that when the bed is in the position of use 28 it reaches the distance between the apex 36 of angular trackway 30 and the lower end 37 of that branch of the trackway which is arcuate and which is carried by the intermediate partition wall 17.

In operation, assuming for the moment that the weight of the bed is suitably supported either by hand or by counterweights or suitable latches, such as those shown in Figures 1, 14 and 15 and the detail of which will be described later, an occupant or porter while standing on offset 18 at the level of seat 20 or on the seat level floor 59 therebelow, and grasping the berth by a suitable hand grip 38 or otherwise, may draw the berth downwardly successively through the two dotted-line positions 40 and 41, Figures 4 and 13, to the position of use 28. The first movement to position 40 carries the outboard pin mounting 33 to the apex of the outboard angular trackway 27, but the inboard pin 33 but partway only toward the apex of the inboard trackway 30. This is by a bodily movement of translation of the bed downwardly and outwardly substantially parallel to its stored position. The next movement to position 41, however, departs from the substantially parallel position 40, the outboard side of the bed being moved vertically downwardly until outboard pins 33 reach the bottoms 31 of trackways 27 and pin mountings 33 enter the outward offsets shown at these ends of the trackways. This bottoming of the outboard mounting with slight outward movement to enter the offsets, takes the inboard mountings 33 precisely to the apices 36 of the inboard trackways 30. In the meantime, the anchor 35 of link 34 connected with that trackway 30 which lies against the end wall 13, has been progressively guided downwardly and outwardly to position the link 34 in substantial parallelism with the outwardly directed slot of this trackway, anchor 35 having entered the horizontal portion of the slot in movement of the bed to the position 40, is then moved to the outer end of said portion of the slot when the bed reaches the position 41, see Figure 13. At this juncture, the inboard side of the bed is lowered. This lowering movement lowers the inboard end of link 34, dragging the outboard anchor 35 connected with the horizontal branch of trackway 30 inwardly to bring link 34 to the dotted-line position of Figure 8 and the full-line position of Figure 13 indicating the bed in its use position 28. Pin mounting 33 in this movement leaves the upper branch of trackway 30 on wall 13 by way of an open slot 42 in the underside of this trackway. This slot 42 is at a radial distance from the offset of lower end 31 of trackway 27 equal to the radius 43 of the arcuate portion of trackway 30, which lies on the end wall 13. Mounting 33 being short, is swung out through the shallow slot 42, but anchor 35 being longer, slot 42 is not deep or wide enough at its bottom to let it through. Therefore, anchor 35 slides on by the slot 42 each time it passes it.

Figure 4:
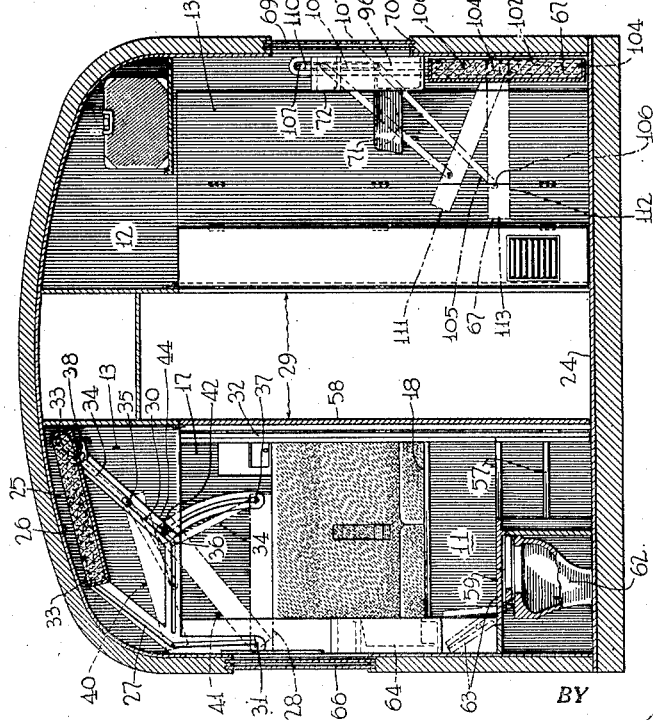
Figure 4 is a view on the same line looking in the opposite direction as indicated by the arrows 4—4.

While the one end of the bed connected with suspension link 34 is thus being lowered (that by wall 13), the opposite end partakes of a similar movement, but in this case its pin mounting 33 simply follows the lower arcuate portion of the track 30, as clearly appears in Figures 4 and 9, entering this portion from the apex 36 of the track. In the position of use 28, the bed hangs suspended by the several mountings 33 from the closed ends of the trackways 27 and 30, though that end of the bed which overlies upper offset 19 of intermediate wall 17 may be afforded either partial or full support by the offset. Suspension link 34, of course, supports that corner of the bed adjoining the end wall 13. The outboard offsets of ends 31 of tracks 27, aid in its retention in position.

To restore the bed after use, the occupant simply reverses this procedure, first raising the inboard side of the bed upwardly to carry the bed angularly about the lower ends 31 of slots 27 to position 41, and then shoving the whole bed upwardly, thus carrying it through the second intermediate position 40, to the storage position illustrated in full lines adjacent the ceiling. Here, mountings 33 entering the inward horizontal offsets of the upper ends of the slots, provide horizontal support upon which the stored bed rests. In passing angularly into position 41, mounting pin 33 at the end of the bed suspended from link 34 enters slot 42 of trackway 30, and the ensuing translating movement carries it upwardly in the slot. Anchor 35 projected by the angular movement outwardly along the horizontal branch, follows it along the same slot but link-length away.

In Figures 6 to 9, I have shown diagrammatically a counterweight system for this bed. Here, it will be seen that there is provided a cable 46 at each end of the bed connected with the outboard side at or near the pin mounting 33. These cables pass upwardly clear of the trackways, substantially paralleling the upper branch of the outboard track 27 over pulleys 47 fixedly mounted in the side wall above the stored bed 25 and thence inboard over pulleys 48, also fixedly secured in the ceiling or roof, at the corner of the room adjoining the aisle 29 and closely adjacent the aisle wall 50 of the room, thence downwardly, in the one case, to counterweight 51, and in the other case, to counterweight 52, which counterweights are respectively suitably housed in metal or other sheathings 53 and 54 which may be in the form of double-walled partitions 13 and 14 in the regions where the counterweights move. These counterweights are rubber sheathed or otherwise guided in order to prevent rattling. The counterweight 51 at the end of the room adjoining end wall 13 is directly connected to its cable 46 and is long and narrow in cross section since there is available ample vertical length of travel in the corner adjacent wall 13 without interference with other elements of the room construction. The cable 46 at the offset end, however, is led over a sheave 55 connected with counterweight 52 and thence upwardly to fixed point 56 of the ceiling or roof, thereby attaining a reduction by one-half of the travel of counterweight 52 and enabling the length of the casing 54 to be accommodated to the available vertical height of the portion 17 of intermediate partition wall 14. In this case, the counterweight 52 is foreshortened and increased in cross section and weight with corresponding increase in size of its casing 54. The upper ends of the casings 53 and 54 and, if desired, the upper ends of the counterweights 51 and 52, although the latter are not so shown in the drawings, may be angularly bevelled (see Figures 8 and 9), the upper ends of the casings being so beveled to prevent interference with the bed as it reaches its storage position.

I have thus diagrammed this counterweight system and omitted showings of it from Figures 1 to 4 in order to avoid complexity of showing and confusion of detail. It will be understood, however, that while the installation of these parts affects slightly the dimensional relations of certain parts shown in Figures 1 to 4, these dimensional changes do not in any wise affect the interrelation shown.

The bed 25 may be positively locked in both its position of use 28 and in its stored position and in the intermediate position 41. Such locking means is shown in detail in Figures 14, 15, 16 and 19. The locking means is arranged at the inboard margin of the bed and may comprise the roller pins 33 mounted on the beds at this region which are made slidable in the beds for this purpose. The anti-friction roller 33' together with anti-friction bearings are slidably mounted on the pins 33 at the opposite ends of the bed and the pins project some distance beyond the roller toward the bottoms of the respective guideway slots in trackway 30. The pin supporting the roller which leaves the guiding slot in trackway 30 through slot 42 may be provided outboard of the roller with a shoulder, see Figures 16 and 18, preventing undue endwise movement of the roller thereon.

These roller mounting and locking pins 33 are normally urged outward toward the bottoms of the respective slots in which they ride by coil springs 43. At the positions where it is desired to lock the bed, as for example, in the intermediate position 41, the bottom of the guiding slots are provided with holes, as 44, into which the sliding mounting and locking pins 33 are projected by their springs 43. The locking pins 33 may be withdrawn from their locking positions in the holes 44 by suitable manually operated means, which in this instance, is comprised of the manipulating handle 38 rotatably mounted on the bed. Rotation of the handle 38 exerts a pull on cables 45 passing around pulleys 45' to actuate the intermediately fulcrumed levers 45'' with their opposite ends connected, respectively, to the cables and the respective slidable locking pins 33. The outward movement of the pins 33 under the action of their springs is limited by a shoulder 43' which prevents the end of the pin 33 which leaves the guiding slot adjacent end wall 13 from scraping on this wall and marring the finish thereof.

By providing locking holes 44 at each of the stored and use positions of the bed, as well as at the intermediate position shown in Figure 19, the bed may be locked securely in each of these positions by the means just described. At the slot 42 it may be desirable to provide a cam 42', see Figures 16 and 19, which automatically causes the adjacent projecting pin 33 to be cammed back as it enters the slot 42.

From the foregoing detailed description, the operation of the locking means is believed clear and further description of its operation would seem superfluous.

Access to offset 18 for the manipulation of the bed is had by the system of steps 57 which takes an occupant entering through the aisle door 58 at the car floor level 24 first upwardly to the seat floor level 59 and thence to the offset level 18. The inboard section 60 of the cushion of seat 20 is foldable upwardly or movable to permit standing directly upon offset 18. The offset itself is slightly less in width under the cushion 60. Indeed, the vertical portion 15 of the intermediate portion of partition wall 14 is inwardly offset at point 61 (see Fig. 1) in this region to minimize the encroachment of the steps longitudinally upon the standing room space between portion 15 and the adjacent end wall 13.

Toilet accommodations 62 are provided at the room floor level 24 against the side wall and facing the door 58. A transversely hinged section 63 of the floor 59 is raised to afford access. Folding washbasin accommodations 64 and cabinet and mirror conveniences 65 are provided on the side wall of the car in the corner between the side wall and the end wall 13. The washbasin when extended reaches out over the toilet accommodations, as clearly appears on the left bottom of Figure 1, and sufficiently over it to afford ready access to one standing on the car floor immediately in front of the toilet accommodations and leaning over the basin. The window 66 reaches from the side of the washbasin and cabinet accommodations over the horizontal cushion of seat 20 all the way to the face of the seat back 21. A trap door, not shown but similar to the trap door shown in the above referred to Murphy application, may be provided at seat floor level which, when closed, extends the seat floor over the entire width of the room.

In the construction and arrangement of the mating room 12 of the unit pair 10, I have provided quite a different arrangement for storing and manipulating the bed 67. In this case, the bed is stored, as clearly appears in the mid-section of Figure 2 and at the left of Figure 1, in a space 68 of a width substantially equal to bed thickness between the outboard end of the seat 22 of this room and the window 69. The bed is of full width and the window sill 70 is of a height above floor level 24 (which is the same as the car floor level) just above the upper side of the stored bed. As in the mating room 11, there are provided in the corner of the room between the car side wall and the end wall 13 washbasin accommodations 71 folding against the side wall and cabinet accommodations 72. The window 69 extends from the side of these accommodations all the way to the front face of the back cushion 23 of seat 22, thus as in the case of room 11 overlapping seat 22 in vertical projection throughout its extent. In height it reaches all the way to the offset 18 of intermediate partition wall 14 in this room. Fixed toilet accommodations 73 are provided beside seat 22 between its aisle end and the aisle wall of the room and facing in the same direction as does the seat 22. The top of this accommodation is upholstered so that it provides additional seating capacity, and the top is hinged and liftable backwardly to afford access; too, there is provided a back cushion 74 in transverse extension of the seat back 23 of the seat 22. This back cushion is supported by pivoting at 75 (see Figure 5) from the middle vertically extending portion 16 of the intermediate wall 14, and is liftable by its lower end to the dotted-line position shown where it may be retained by suitable latches (not shown). When so lifted, it opens access from the remaining space of the room to the space 76 behind the toilet accommodations 73. When in the position of use, its lower end is supported under back pressure of an occupant by a bracket 77 on the horizontal shelf 78 which, with the wall portion 15 and the vertical wall 79, forms the locker space 80 accessible from the aisle 29 by means of an outwardly opening door 81 shown in the dotted lines of Figure 5, this space being closed off at its rear by a partition wall 82, shown in dotted lines in Figure 2. This space may be used for spare linen and bedding or for other purposes for the convenience of the porter.

Figure 1:
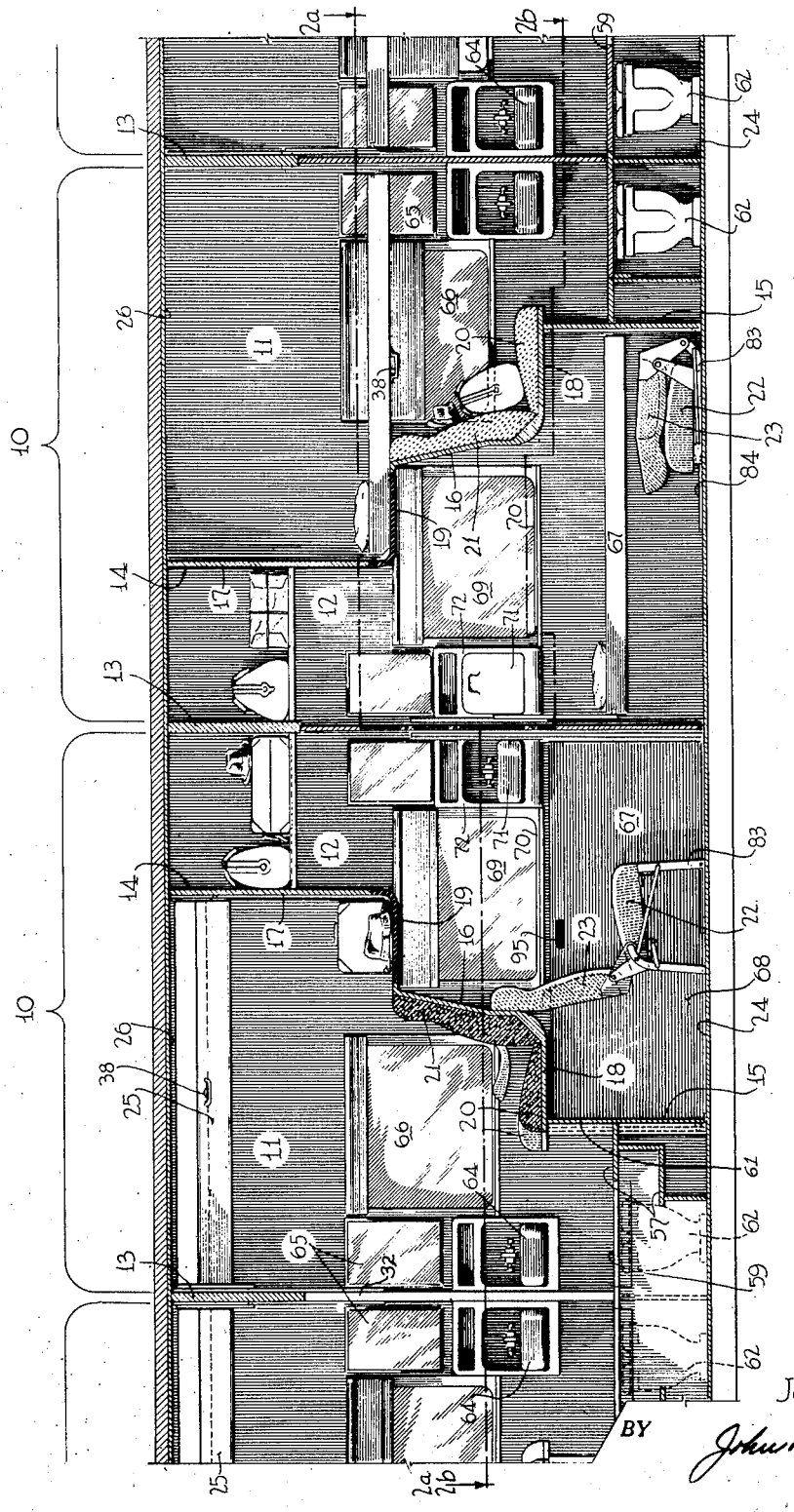
Figure 1 is a longitudinal vertical section of one of the series of rooms, the upper of the two series shown in Figure 2 (next to be described), taken on the line 1—1 of Figure 2.

The seat 22 with its back 23 is collapsible and folding, as clearly appears from reference to Figure 1. I have illustrated one form of folding chair mechanism which I shall not describe here since there are a number of such which would be suitable. Legs 83 and back 23 collapse horizontally to substantially parallel the seat cushion and occupy substantially little vertical space when resting upon the floor level 24. When it is so collapsed, the space vertically above it is entirely free to receive the bed 67 when in the extended position of use, as appears at the right of Figure 1. However, with the triple object of affording more storage space under the bed, avoiding interference with the bed when it is moved from stored use to use position and outstandingly to lower the level of the use position, I prefer to move the collapsed seat 22 rearwardly and then transversely out of the way against the portion 15 of the intermediate partition wall 14. This I achieve by providing beneath the chair, all as shown most fully in dotted lines at the lower left of Figure 2, a depending guiding frame 84 pivoted to the lower extremities of the front legs 83 of the chair to depend therefrom on a transverse axis 85 and bearing by guide rollers 86 on opposite sides of the fixed guideway or rail 87 (see Figure 1). When the chair is initially collapsed to the position shown in Figure 1, it occupies the position shown in full lines at the left of Figure 2. Thereupon, the legs being mounted on suitable casters, it may be shoved directly rearward, first to the dotted-line position designated 88. In this position, its rear end has been angled inwardly several inches by reason of the inward curve 89 of the guide rail 87. In this position, the rollers 86 strike a stop 90. At this point, the occupant moves the front portion of the collapsed chair toward the aisle 29 carrying the chair to a second dotted-line position of storage designated 92 in which it lies in the space 93 alongside the storage space 68 behind the toilet accommodation 72. The space the chair occupied in use, therefore, is entirely free for baggage storage or the like and there is no obstruction for the movement of the bed to its position of use, and it can be moved to a low level position for use.

The bed may now be freely moved to such a position of use merely by grasping an operating hand hold 95 (see Figure 1) and drawing it toward the aisle while lowering the inboard edge thereof until it reaches horizontality. In this movement and at other times, it is supported and guided at its opposite ends respectively by trackways 96 and 97 located one upon the end wall 13 and the other upon the vertically extending lower wall portion 15 of the intermediate partition wall 14. The latter, by reason of the permanency of this wall, comprises a vertically extending slot 98 adjoining the car side and a horizontally extending slot 99 substantially at right angles to the car side and terminating inboard toward the aisle 29 in an arcuate extension 100 having a closed lower end horizontally at substantially the same level as the upper horizontally offset end 101 of the lower slot 98 of the slotted trackway, the arcuate portion 100 being formed on a radius about this upper offset end 101. All ends of the trackways are closed. The horizontal slot 99 has its outboard end slightly upwardly inclined and provided at the extreme end (see Figure 11) with a downward offset. The horizontal offset affords a support for the bed in use position and the downward offset in slot 99 maintains the bed in stored position; and the arcuate portion 100 of the trackway 97 positively holds it in this support offset when the bed is in use position.

The opposite trackway on the wall 12 comprises a lower vertical portion 102, an exact counterpart in form and arrangement to the lower portion 98 of trackway 97, and an upper slotted portion 103 which, like the lower portion 102, is vertically extending and lies substantially over against the side wall. The bed at this end is supported by a lower pin mounting 104 carrying an anti-friction roller permanently engaged and retained in slot 102 together with link 105, whose lower end 106 is pivoted to the outer portion of this end of the bed and at its upper end provided with a pin mounting 107 similar to mounting 104 engaging and retained in slot 103, as is the mounting 104 in the slotted way 102. The upper end of slot 102 is provided with a horizontal offset 101 similar to the horizontal offset at the upper end of slot 98 and the support pin of the bed is positively held in this offset by a cam block 112 on the side wall of the car engaging the edge of the bed when in the use position, this block in the movement of the bed to the use position first forcing the pin to enter the offset and thereafter maintaining it there while the bed is in this use position. At the opposite end in trackway 97, the bed support is only by roller mounting pins 108 and 109 on the bed similar in all respects to mounting pins 107 and 104 and engage respectively in trackway portions 99, 100 and 98.

Figure 3:
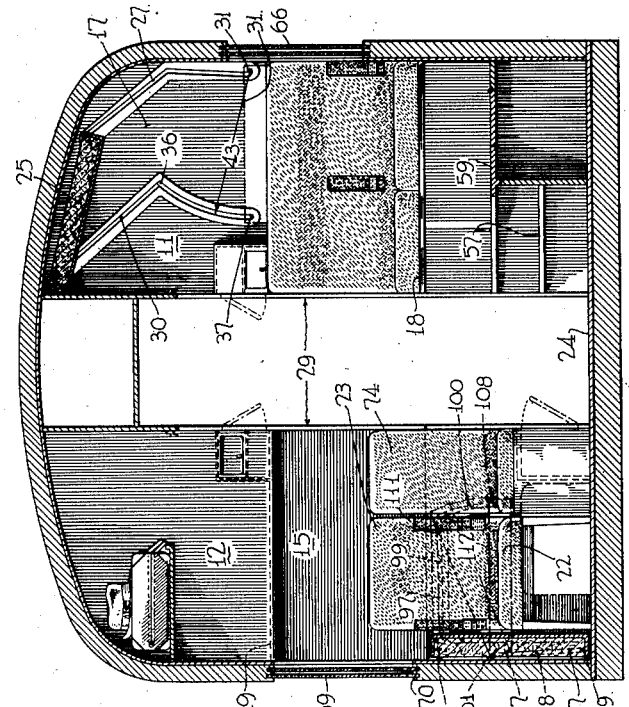
Figure 3 is a vertical cross section on the line of Figure 2 indicated by the arrows 3—3.

Operation from the position of storage shown in full lines in Figures 3 and 4 to the position of use shown in dotted lines is simply the following: In the position of storage with the top of the bed facing the side wall mounting, pins 104, 109 lie in the closed bottoms of trackways 102 and 98. Mounting pin 108 lies in the slight downward offset at the closed outboard end of trackway section 99. There is no corresponding mounting pin at the opposite end of the bed. Instead, link 105 lies in its position 110 paralleling trackway 96 and with its mounting pin 107 at the upper end of trackway portion 103. This bed 67 being of the same light construction as the bed 25, the operator simply grasps the hand grip 94 and draws the upper side of the bed toward the aisle. Roller mounting 108 follows trackway 99 and roller mountings 104, 109 follow lower trackways 102 and 98 moving upwardly as the side of the bed moves substantially horizontally inwardly toward the aisle. The upward movement is assisted by suitable counterweights to be described later on. The end of link 105 carrying mounting pin 107 moves downwardly and the other end moves outwardly of the wall until the bed occupies the intermediate angular position designated 111, Figures 11 and 12, in which roller pin mountings 104 and 109, respectively, lie in the closed horizontal offset ends of slotted trackways 102 and 98, respectively. The location of the pins 104 with respect to the outboard side of the bed is such that at about this juncture the side of the bed at the end connected with link 105 engages cam block 112 on the side wall, and roller pin mountings 104 and 109 are at the entrance of the inward offsets of the upper end of lower trackways 102 and 98, respectively. It is in this position that pin mounting 108 has reached the upper extremity of arcuate portion 100 of trackway 99 and is ready to enter it (see Figures 3 and 11). Link 105 at this juncture has not yet reached the berth supporting position, as clearly appears in Figure 4. The operator then simply lowers the aisle side of the bed. This movement pivots the bed about the upper ends of trackways 102 and 98, and it is most readily moved angularly to the position of use 113. In this position, the aisle side is supported by mounting 108 which bottoms in the closed-end trackway 100 at the one end and by link 105 at the opposite end by reason of the bottoming of its pin mounting 107 at the bottom of the upper slotted trackway section 103. On the outboard side, pins 104 and 109 have been moved into the horizontally offset upper ends of trackways 102 and 98, respectively, under the action of cam block 112 and arcuate slot 100, and so fixedly support the bed on that side. Figures 11 and 12 clearly show, by means of full and dotted lines, the use and storage positions and various intermediate positions of the bed 67 in its movement from stored to use position and vice versa.

After use, a reversal of this movement carries the bed immediately back into its storage position inside the side wall, as shown in full lines. The chair seat can then be drawn out by moving the front portion of the collapsed chair toward the side wall of the car and moving it longitudinally. The collapsed chair is then raised by raising the foldable back and the collapsed seat (springs are suitably provided in some such chairs to aid in such movements). This back when upright then lies contiguous to or against the middle portion 16 of wall 14. The toilet seat back 74 forming the lateral seat back extension (see Figure 5) having been lowered, all is restored to condition of daytime occupancy.

Positive means for locking the bed in the use position, in the stored position and in the intermediate position shown in full lines in Figures 11 and 12 and in dotted lines in Figure 4 may be entirely similar to the locking means shown and described in connection with bed 25.

In Figures 6, 7 and 10, I show a counterweight system for the beds 67 generally similar to that shown and described in connection with beds 25, arranged to partially or wholly relieve the room occupant from the weight which he lifts in adjusting these beds. According to this system and with particular reference to bed 67, a single counterweight 114 which travels up and down vertically in a housing 115 associated with end partition wall 13, is connected with the outboard side of the bed 67 (the bottom when it is stored) by a cable 116 which extends vertically upward over a fixed pulley 117 appropriately journalled within the housing 115 and thence downwardly to connect with the bed frame at a point, of course, without the housing 115. Pulley 117 will be given the proper angle to clear the cable without the housing 115 and lead it to the bed frame without interference. The connection with the bed frame is at the end adjoining the wall 13 only. There is no connection with and no counterweight provided at the opposite end of bed 67 to weight that which adjoins the lower portion 15 of the intermediate wall 14. I have found by actual experiment with full sized and full weighted mock-ups that a counterweight system so arranged functions perfectly to relieve the occupant of so much of the burden of lifting as may be desired simply by making the counterweight 114 of greater or less size, as may be preferred.

Because the actual length of the lower trackway portions 98, 102 is not very great, the movement of the counterweight 114 connected to that side of the bed which is guided in these trackways does not have to be great. Accordingly, I locate counterweight 114 for the bed 67 in the one room 12 in one and the same housing 115 with the counterweight 114 connected with the bed 67 in the adjoining room 12 of the next pair of rooms 10, as clearly appears in Figures 6 and 7 at the right, the one weight 114 running in the lower part of housing 115 and the other vertically above it in the upper part of the housing. This simply requires that the upper weight 114 has a longer cable 116, one of sufficient length to reach to the uppermost pulley 117 and thence all the way down to the outboard side of the bed in the adjoining room.

Instead of constituting the several housings illustrated as sheet metal parts separate from the respective walls in connection with which they are located, I may embody these housings directly within these walls, either by constituting the housings 53, 54, 115 parts of these walls or by making the walls hollow and housing the several weights 51, 52, 114 within the hollow walls. In any case, the locations and angles of the pulleys will be such as to carry the cables from the pulleys without the housings or walls to the bed frames with which they respectively connect.

In connection with the counterweight systems for the beds 25 and 67, it should be noted that in the instance of the beds 25 in rooms 11, the counterweight system is arranged to aid in lifting the bed from position of use to position of storage and retaining it there, and the latch is arranged to retain it there, whereas in the instance of beds 67 in rooms 12, the counterweight system is arranged to help lift the bed from the position of storage to the position of use.

Above the horizontal upper offset wall 19, as clearly shown in Figure 5, and in the space between the inner margin of the beds 25 and the aisle wall, arranged in superposed relation, are shoe boxes 118 and 119, one, 119, communicating by a door 120 with room 11, and the other by door 121 in the vertical portion 17 of the transverse partition 14 with the adjoining room 12. Each box communicates, as usual, with the aisle by a similar door opening and door, so the porter can remove the shoes of the occupants from the boxes for cleaning and shining and replace them when cleaned and shined.

As in the Murphy application above referred to, the adjacent rooms separated by the end walls 13 are rendered intercommunicating through doorways and doors and each room is made intercommunicating with the aisle by a doorway opposite the full height standing room space therein. All the doorways are arranged at car floor level.

While the invention has hereinbefore been described in a specific embodiment thereof, it will be understood that changes and modifications may be made by those skilled in art without departing from the spirit and scope of the invention, and such changes are intended to be covered by the appended claims.

What is claimed is:

1. In a sleeping car, a room having a ceiling, arranged between a side wall and an aisle wall of the car and having its ends defined by spaced transverse walls interconnecting the aisle and car side walls, a fixed-length bed extending longitudinally between said transverse walls and movable from a storage position adjacent the ceiling to an intermediate position and finally to a lower horizontal use position, and means for guiding said bed in such movement and supporting it in use position, comprising outboard and inboard trackways on at least one of said transverse walls cooperating with pins on said bed, the outboard trackway including an upper outwardly inclined portion merging into a generally vertical portion having a closed lower end, the inboard trackway including an upper portion generally paralleling the upper portion of the outboard trackway and merging at its lower end into an arcuate portion having a closed lower end.

2. In a sleeping car, a room having a ceiling, arranged between a side wall and an aisle wall of the car and having its ends defined by spaced transverse walls interconnecting the aisle and car side walls, a fixed-length bed extending longitudinally between said transverse walls and movable from a storage position adjacent the ceiling to an intermediate position and finally to a lower horizontal use position, outboard and inboard inclined trackways on at least one of said transverse walls cooperating with pins on said bed for guiding said bed from its storage position through its intermediate position to its horizontal use position and for supporting it in said last-named position, and means for locking the bed in the intermediate position.

3. In a sleeping car, a room having a ceiling, arranged between a side wall and an aisle wall of the car and having its ends defined by spaced transverse walls interconnecting the aisle and side walls, a fixed-length bed extending longitudinally between said transverse walls and movable from a storage position adjacent the ceiling to an intermediate position and finally to a lower horizontal use position, means for guiding it in such movement comprising outboard and inboard outwardly and downwardly inclined trackways cooperating with pins on the adjacent end of the bed, and counterbalance means movable within closed housings associated with the respective transverse walls and connected to the outboard margin of the bed only for relieving the operator of at least a portion of the weight of the bed in moving it between use and storage positions.

4. In a sleeping car, a room defined by a floor, a ceiling, and a car side wall, an aisle wall and spaced transverse walls interconnecting the floor and ceiling, a fixed-length bed extending longitudinally in said room and movable from a storage position adjacent the ceiling of the room to a lower horizontal use position, counterweights operatively connected to the opposite ends of the bed to ease its movement by the operator, said counterweights being disposed in closed housings associated with the respective transverse walls of the room, the counterweight at one end of the bed being relatively light and connected to the bed by a flexible element passing directly from said counterweight over a fixed pulley, the counterweight at the opposite end of the bed being relatively heavy, and connected to the bed by a flexible element passing over a fixed pulley, thence over a movable pulley connected to the counterweight and finally to a fixed point in the vertical region of said fixed pulley.

5. In a sleeping car, a room having a ceiling and arranged between a side wall and a center aisle wall of the car and having its ends defined by spaced transverse walls interconnecting the aisle and car side walls, a fixed-length bed extending longitudinally from transverse wall to transverse wall, and movable from a stowed position adjacent the ceiling to a lower horizontal use position, outboard and inboard generally outwardly and downwardly inclined trackways on said transverse walls, said trackways cooperating with rollers mounted adjacent the outboard and inboard margins of the ends of the bed for guiding said bed from said stowed position downwardly and outwardly to an intermediate position in which its outboard margin is supported by the engagement of the adjacent rollers with the closed lower ends of the outboard of said trackways at the intermediate position permitting the bed to be swung from said position about its outboard supported margin as a pivot to the horizontal use position in which it is supported at its inboard margin, in part at least, by the closed lower end of said inboard trackways.

6. In a sleeping car, a room arranged between a side wall and a center aisle wall of the car, said room having at car floor level a standing floor area occupying a substantial portion of the width of the room, said room being defined longitudinally by spaced transverse walls, one of substantially planar form and the other being formed with a longitudinal offset forming a recess opening into the room adjacent the ceiling thereof, a seat in the room adjacent said offset transverse wall, and a fixed-length made-up bed disposed in stowed position clearing the standing-floor area for daytime occupancy and movable to horizontal use position across the standing room area in which the bed extends from the inner end of said recess to the associated planar-form transverse wall, for nighttime occupancy.

7. In a sleeping car, a room arranged between a side wall and a center aisle wall of the car, said room being defined longitudinally by spaced transverse walls, one of substantially planar form and the other having a longitudinally extending recess therein opening into the room adjacent the ceiling thereof, a fixed-length made-up bed in the room movable between a use position extending across most of the standing-floor area of the room and stowed position clearing the standing floor area of the room, said bed in use position extending into the recess at one end thereof and having its opposite end extending to said planar-form transverse wall, and means for supporting and guiding the bed in its movement bodily between its use position adjacent the bottom of the recess and a stowed position adjacent the room ceiling.

8. In a sleeping car, a room arranged between a side wall and a center aisle wall of the car, said room having a standing floor area at substantially the car floor level, and being defined longitudinally by spaced transverse walls, one of substantially planar form and the other having a longitudinally extending recess opening into the room, a seat in the room disposed adjacent said recessed transverse wall, and a fixed-length made-up bed in the room extending from the inner end of the recess to the opposite planar-form transverse wall, said bed being normally stowed adjacent the ceiling for daytime occupancy but movable to a lower horizontal use position adjacent the bottom of the recess and extending across most of the standing-floor area of the room, for nighttime occupancy.

9. In a sleeping car, a room arranged between a side wall and a center aisle wall of the car, said room having a standing-floor area at car floor level, and being defined longitudinally by spaced transverse walls, one of substantially planar form and the other having a longitudinal offset in its upper portion providing a longitudinally extending recess opening into the room, a seat disposed adjacent said offset transverse wall, a fixed-length made-up bed in the room stowed adjacent the ceiling and movable bodily between said stowed position and a horizontally extending use position extending across most of the standing floor area of the room, said seat being of substantially the full transverse width of the room and a toilet disposed at car floor level adjacent the corner formed by the planar transverse wall and the car side wall and disposed transversely of the car.

10. In a sleeping car, a room arranged between a side wall and a center aisle wall of the car and defined longitudinally by spaced transverse walls, one of substantially planar form and the other having a longitudinal offset in its upper portion providing a recess opening into the room, a seat in the room adjacent to, but facing away from, said recessed transverse wall, a standing room area at car floor level in said room between the seat and the planar-form transverse wall, a fixed-length made-up bed in the room extending from the planar transverse wall to the inner end of the recess in the transverse wall opposite, the bed being bodily movable between a stowed position in which it clears the standing-floor area and a use position in which it extends horizontally across said area, and a folding wash-basin in the room hinged to and normally folded against the car side wall and movable to horizontally extended use position in which it is accessible from the associated standing floor area.

JOHN C. LYON.

REFERENCES CITED

The following references are of record in the file of this patent:

UNITED STATES PATENTS

| Number | Name | Date |
|---|---|---|
| 20,622 | Case | June 22, 1858 |
| 242,801 | Starr | June 14, 1881 |
| 362,692 | Wood | May 10, 1887 |
| 561,654 | Cole | June 9, 1896 |
| 619,174 | Haskins | Feb. 7, 1899 |
| 772,740 | O'Leary | Oct. 18, 1904 |
| 864,489 | Schmedes | Aug. 27, 1907 |
| 1,417,719 | Covington | May 30, 1922 |
| 1,763,490 | Turner | June 10, 1930 |
| 1,986,342 | Hutt | Jan. 1, 1935 |
| 2,156,229 | Ragsdale et al. | Apr. 25, 1939 |
| 2,220,253 | Lundberg | Nov. 5, 1940 |
| 2,364,595 | Tully et al. | Dec. 5, 1944 |

FOREIGN PATENTS

| Number | Country | Date |
|---|---|---|
| 32,225 | Austria | Mar. 10, 1908 |
| 330,461 | Germany | Dec. 15, 1920 |